(12) United States Patent
Liu (10) Patent No.: US 8,750,890 B2
(45) Date of Patent: Jun. 10, 2014

(54) MICROCELL CREATING METHOD BASED ON MACROCELL NETWORK COVERAGE

(71) Applicant: Huawei Technologies Co., Ltd., Guangdong (CN)

(72) Inventor: Sheng Liu, Shenzhen (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/717,155

(22) Filed: Dec. 17, 2012

(65) Prior Publication Data

US 2013/0109400 A1  May 2, 2013

Related U.S. Application Data (63) Continuation of application No. PCT/CN2011/074714, filed on May 26, 2011.

(30) Foreign Application Priority Data

Aug. 13, 2010  (CN) .......................... 2010 1 0254366

(51) Int. Cl.
*H04B 7/04* (2006.01)
(52) U.S. Cl.
USPC ......................................... 455/452.1; 455/446
(58) Field of Classification Search
CPC ..... H04W 16/24; H04W 16/28; H04W 16/32; H04W 72/046; H04W 84/045; H04B 7/0452
USPC ............ 455/443, 444, 446, 452.1, 561, 562.1
See application file for complete search history.

(56) References Cited

U.S. PATENT DOCUMENTS

| | | | |
|---|---|---|---|
| 6,950,678 B1 * | 9/2005 | Mujtaba et al. ............ 455/562.1 |
| 2009/0215480 A1 | 8/2009 | Kim et al. |
| 2011/0028156 A1 | 2/2011 | Zhu et al. |

FOREIGN PATENT DOCUMENTS

| | | |
|---|---|---|
| CN | 1325241 A | 12/2001 |
| CN | 101557249 A | 10/2009 |
| CN | 101562817 A | 10/2009 |
| WO | 2009/084904 A2 | 7/2009 |

OTHER PUBLICATIONS

International Search Report in corresponding International Patent Application No. PCT/CN2011/074714 (Sep. 8, 2011).
1st Office Action in corresponding Chinese Patent Application No. 201010254366.3 (Jun. 28, 2013).
Written Opinion of the International Searching Authority in corresponding PCT Patent Application No. PCT/CN2011/074714 (Sep. 8, 2011).
"LTEA2010PHY_008—HetNet Concept Slide," May 31, 2010, V1.0, Huawei, Shenzhen, China.

* cited by examiner

*Primary Examiner* — Sam Bhattacharya
(74) *Attorney, Agent, or Firm* — Leydig, Voit & Mayer, Ltd.

(57) ABSTRACT

A microcell creating method based on macrocell network coverage and a base station are disclosed. The method may include setting a beam width and a beam direction of a highly directional antenna according to location information of a hotspot area, and generating microcell coverage or the hotspot area by using beams generated by the highly directional antenna. Embodiments of the present invention may keep the micro base station location unchanged when the hotspot area changes, and may implement microcell coverage for the hotspot area simply by adjusting the beam width and the beam direction of the highly directional antenna.

16 Claims, 5 Drawing Sheets

MICROCELL CREATING METHOD BASED ON MACROCELL NETWORK COVERAGE

CROSS-REFERENCE TO RELATED APPLICATIONS

This application is a continuation of International Patent Application No. PCT/CN2011/074714, filed on May 26, 2011, which claims priority to Chinese Patent Application No. 201010254366.3, filed on Aug. 13, 2010, both of which are hereby incorporated by reference in their entireties.

FIELD OF TECHNOLOGY

The present invention relates to the field of mobile communication technologies, and in particular, to a microcell creating method and a base station.

BACKGROUND OF THE INVENTION

Generally, a mobile communication network is a cellular network. That is, different base stations are set up in different areas, and each base station forms a cell and is responsible for communication with mobile users in this area. In an existing mobile communication network, there are some hotspot areas with a large communication traffic volume. To provide a high system capacity for the hotspot areas, microcells are generally set up in the hotspot areas to serve the mobile users in the hotspot areas.

In the prior art, a mobile communication network generally has a multi-layer cell structure (Heterogeneous Network, HetNet). First, a macrocell (Macro-Cell) is created through a macro base station to accomplish wide continuous network coverage, and then microcells are created through micro base stations in the hotspot areas to implement overlap coverage. Microcells provide a high system capacity.

In the process of researching the prior art, the inventor of the present invention finds that a proper site needs to be selected in the hotspot area to set up a micro base station before the microcell is created by the micro base station in the hotspot area. If the hotspot area changes, a new site needs to be selected for setting up the micro base station to form network coverage for the hotspot area, which lacks flexibility of networking and increases network maintenance costs.

SUMMARY OF THE INVENTION

Embodiments of the present invention provide a microcell creating method and a base station so that a microcell covering the hotspot area can be created without requiring selection of a new proper site when the hotspot area changes.

First, a microcell creating method provided in an embodiment of the present invention includes:

setting a beam width and a beam direction of a highly directional antenna according to location information of a hotspot area; and generating microcell coverage for the hotspot area by using beams generated by the highly directional antenna.

Another microcell creating method provided in an embodiment of the present invention includes:

setting a beam width and a beam direction of a highly directional antenna according to location information of a relay station; and providing a relay link between the relay station and a micro base station by using beams generated by the highly directional antenna.

Further, a base station provided in an embodiment of the present invention includes:

a first macrocell communication unit, configured to generate macrocell coverage;

a first microcell communication unit, which includes:

a first beam forming module, configured to set a beam width and a beam direction of a highly directional antenna according to location information of a hotspot area; and a first microcell communication processing module, configured to generate microcell coverage for the hotspot area by using beams generated by the highly directional antenna.

Another base station provided in an embodiment of the present invention includes:

a second macrocell communication unit, configured to generate macrocell coverage;

a second microcell communication unit, which includes:

a second beam forming module, configured to set a beam width and a beam direction of a highly directional antenna according to location information of a relay station; and a second microcell communication processing module, configured to provide a relay link between the relay station and a micro base station by using beams generated by the highly directional antenna.

In the embodiments of the present invention, the beam width and the beam direction of the highly directional antenna are set according to location information of the hotspot area, and micro cell coverage for the hotspot area is directly generated by using the beams generated by the highly directional antenna. Compared with the prior art that requires selection of a new site of the micro base station, the embodiments of the present invention keep the micro base station location unchanged when the hotspot area changes, and can implement microcell coverage for the hotspot area simply by adjusting the beam width and the beam direction of the highly directional antenna, thereby making the networking mode flexible and reducing the network maintenance costs.

BRIEF DESCRIPTION OF THE DRAWINGS

To make the technical solutions of the present invention more comprehensible, the following outlines the accompanying drawings used in description of the embodiments of the present invention. Apparently, the accompanying drawings outlined below are not exhaustive, and persons of ordinary skill in the art can derive other drawings from them without any creative effort.

DETAILED DESCRIPTION OF THE EMBODIMENTS

Embodiments of the present invention provide a microcell creating method and a base station. The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

Figure 1:
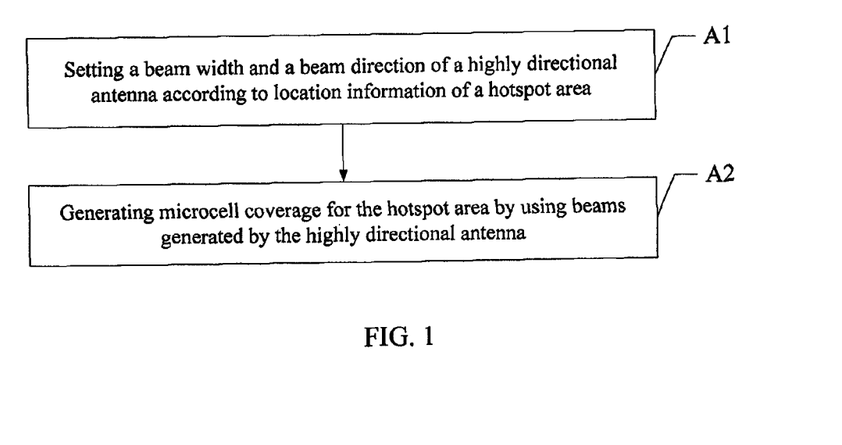
FIG. 1 is a flowchart of a microcell creating method according to a first embodiment of the present invention.

FIG. 1 is a flowchart of a microcell creating method according to a first embodiment of the present invention.

In the embodiments of the present invention, a macro base station provides seamless continuous coverage for a macrocell in the area. The microcell creating method based on the macrocell network coverage in an embodiment of the present invention may include:

A1. Setting a beam width and a beam direction of a highly directional antenna according to location information of a hotspot area.

Specifically, in this embodiment, the location information of the hotspot area in the macrocell network may be obtained, and then the beam width and the beam direction of the highly directional antenna are set through a beam forming algorithm according to the location information of the hotspot area. In an embodiment, the hotspot areas in a macrocell network may be obtained beforehand; in another embodiment, the traffic distribution in the entire macro cell may be gathered statistically to know the hotspot areas in the macrocell network.

A beam corresponding to the beam width and the beam direction can cover the hotspot area. The location information of the hotspot area may include area and shape of the hotspot area, azimuth of the hotspot area relative to the location of the micro base station, and so on.

The entity for executing the method in the first embodiment may be a micro base station. In this case, the location of the micro base station is called a site of the micro base station, and the site of the micro base station may be the same as the site of the macro base station.

It should be noted that in the first embodiment of the present invention, because the micro base station which is the entity for executing the method shares a site with the macro base station in the same area, the foregoing functions of the micro base station may be implemented by a corresponding device added into the macro base station in practice. That is, the macro base station provides the macrocell coverage of the area, and the device added in the macro base station provides microcell coverage for the hotspot area. Therefore, in this case, the entity for executing the method of the present invention may be the macro base station, and the device added into the macro base station is equivalent to the micro base station. Therefore, the execution entity of the embodiment of the present invention shall not be construed as a limitation on the present invention.

A2. Generating microcell coverage for the hotspot area by using beams generated by the highly directional antenna.

Specifically, in this embodiment, highly directional beams generated by the highly directional antenna may be used to generate microcell coverage for the hotspot area. The beams generated by the highly directional antenna provide multiple physical channels of the microcell such as common control channel, dedicated control channel, and traffic channel. The beams are also used to transmit data between the user equipment of the hotspot area and the micro base station. The type of the microcell may be picocell (Pico-Cell) or femtocell (Femto-Cell).

In the first embodiment of the present invention, the beam width and the beam direction of the highly directional antenna are set according to location information of the hotspot area, and micro cell coverage for the hotspot area is generated directly by using the beams generated by the highly directional antenna. Compared with the prior art, this embodiment keeps the micro base station location unchanged when the hotspot area changes, and can implement microcell coverage for the hotspot area simply by adjusting the beam width and the beam direction of the highly directional antenna, thereby making the networking mode flexible and reducing the network maintenance costs.

Figure 2:
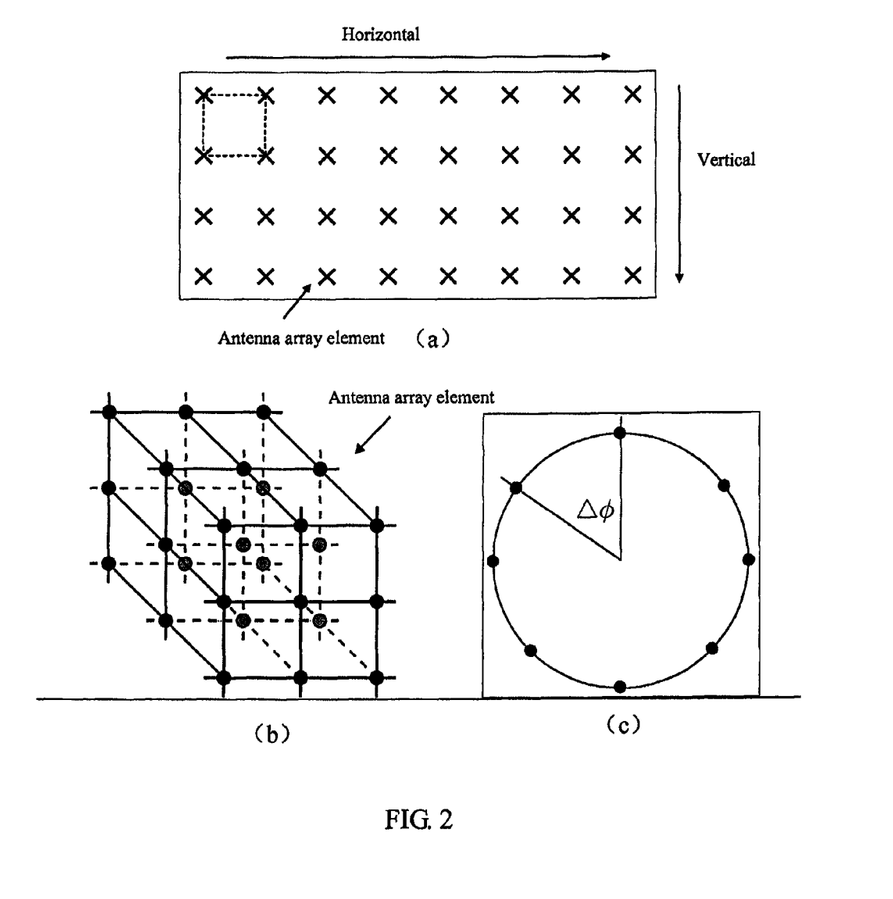
FIG. 2 is a schematic diagram of an array antenna according to an embodiment of the present invention.

FIG. 2 is a schematic diagram of an array antenna according to an embodiment of the present invention.

In this embodiment, the highly directional antenna for creating the microcell may be an array antenna, or another type of antenna. For example, when the signal frequency is high, such as in the microwave band, the highly directional antenna may be a parabolic antenna. When a linear array is applied, because no beam is formed in the vertical direction, a fan-shaped microcell may be formed. When a planar antenna is applied, as shown in FIG. 2 (*a*), 32 array elements may be arranged in an 8×4 plane evenly to form narrow beams in both horizontal and vertical directions at the same time, namely, 3D beam forming. In other words, the beams are formed in both horizontal and vertical directions at the same time so as to better generate the microcell. Besides, the circular array shown in FIG. 2 (*b*) and the 3-dimensional grid array antenna shown in FIG. 2 (*c*) can also implement 3D beam forming.

Figure 3:
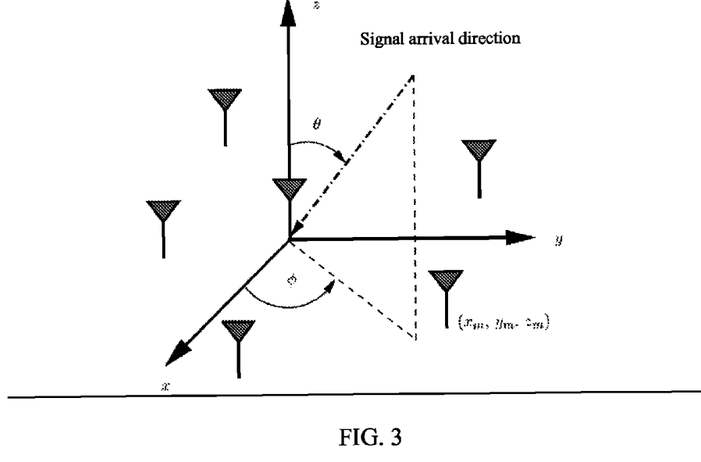
FIG. 3 is a schematic diagram of space coordinates of an array element in an array antenna according to an embodiment of the present invention.

FIG. 3 is a schematic diagram of space coordinates of an array element in an array antenna according to an embodiment of the present invention.

As shown in FIG. 3, for an array antenna that has M array elements in any array geometries, the coordinate origin is an array element numbered 1; array element m is located in $(x_m, y_m, z_m)$; if the direction of arrival of a far field signal is $(\phi, \theta)$, the signal may be expressed as the following vector:

$u(t) = [u_1(t), u_2(t), \ldots, u_M(t)]$, where $u_m(t)$, $m=1, 2, \ldots, M$ is the received (or transmitted) signal of array element m, and therefore, the signals of all array elements form the following relationship:

$u_m(t) = u_1(t) a_m(\phi, \theta)$, where $$a_m(\varphi, \theta) = e^{-j\frac{2\pi}{\lambda}f(\varphi,\theta,x_m,y_m,z_m)}$$

represents the phase difference between the array element signals. The phase difference depends on a function $f(\phi,\theta x_m, y_m, z_m)$ of the location of the array element and the direction of arrival of the signal. For ease of description, the phase difference between the array element signals is expressed as a direction vector as follows:

$$a(\varphi, \theta) = \begin{bmatrix} 1 \\ a_2(\varphi, \theta) \\ \vdots \\ a_M(\varphi, \theta) \end{bmatrix}$$

A complex weight vector $w=(w_1, w_2, \ldots, w_M)$ is used to calculate a weighted sum for all array element signals to obtain:

$$\begin{aligned} v(t) &= u_1(t) \sum_{m=1}^{M} w_m^* e^{-j\frac{2\pi}{\lambda}f(\varphi,\theta,x_m,y_m,z_m)} \\ &= u_1(t)(w_1^*, w_2^*, \ldots, w_M^*) \begin{bmatrix} 1 \\ a_2(\varphi, \theta) \\ \vdots \\ a_M(\varphi, \theta) \end{bmatrix} \\ &= w^H u(t) \end{aligned}$$

Evidently, through selection of a proper weight vector w, desired signals from the arrival direction $(\theta,\phi)$ can be maximized, and the interfering signals from other directions may be suppressed. For the entire array antenna, this process is equivalent to generating beams in a specific direction. The operation of the weighted sum may be performed on radio frequency signals, or on a baseband. The weighted sum implemented on the baseband is generally known as digital beam forming. The beam forming can be implemented in both the receiving direction and the transmitting direction. Plenty of mature algorithms are now available as the beam forming algorithm, namely, calculation method of the weight vector w. The embodiments of the present invention are not limited to a specific beam forming algorithm.

In a traditional adaptive array antenna system, each user needs to be tracked in beam forming. In this embodiment of the present invention, however, the users do not need to be tracked, but relatively fixed beams are formed and directed to certain hotspot areas. Because the hotspot areas are relatively fixed in a time period (a few hours, a few days or months), it is not necessary to change the beams dynamically and quickly for each radio frame. Therefore, in this embodiment, beams can be directly formed on the radio frequency, and it is not necessary to perform digital beam forming on the baseband, thereby accomplishing cost efficiency. For each beam, only one channel of baseband needs to be processed, which avoids complexity.

Besides, when two or more microcells in a macrocell are created through the method disclosed herein, different microcells can share a group of array antennas. The total beam forming weight vector is a sum of beam forming weight vectors of all microcells. In downlink transmitting beam forming, if two microcells exist in different locations and correspond to two different directions $(\phi_1,\theta_1)$ and $(\phi_2,\theta_2)$, the transmitted signals are $u_1(t)$ and $u_2(t)$, and the weight vectors $w_1$ and $w_2$ are used for weighting respectively, the transmitted signal vector is:

$$s(t) = w_1 * u_1(t) + w_2 * u_2(t)$$

Therefore, the received signals of the user equipment in the arrival direction $(\phi_1,\theta_1)$ may be expressed as:

$$y_1(t) = a(\phi_1,\theta_1)^T s(t) + n_1(t) = a(\phi_1,\theta_1)^T w_1 * u_1(t) + a(\phi_1,\theta_1)^T w_2 * u_2(t) + n_1(t),$$

Where $n_1(t)$ is a noise signal. If a proper beam forming algorithm is applied to minimize the interference component power $|a(\phi_1,\theta_1)^T w_2^*|^2$ and maximize the desired signal component power $|a(\phi_1,\theta_1)^T w_1^*|^2$, the user equipment in the arrival direction $(\phi_1,\theta_1)$ receives only the desired signal, without suffering interference from other microcell signals. Similarly, the same mode is applied to the other microcell. That is, the weight vectors $w_1$ and $w_2$ are designed to maximize the following signal-to-interference noise ratio (Ratio Signal Interference Noise Ratio, SINR):

$$SINR_1 = \frac{|a(\varphi_1,\theta_1)^T w_1^*|^2}{|a(\varphi_1,\theta_1)^T w_2^*|^2 + \sigma_1^2}, \text{ and}$$

$$SINR_2 = \frac{|a(\varphi_1,\theta_1)^T w_2^*|^2}{\|a(\varphi_1,\theta_1)^T w_1^*\|^2 + \sigma_2^2},$$

Where $\sigma_1^2$ and $\sigma_2^2$ are noise power. Because receiving is paired with sending, the uplink receiving direction may work in a similar way. The uplink direction and the downlink direction, namely, the receiving direction and the transmitting direction, may use the same or different beam forming vector. The beam direction and the beam width may be set by adjusting a beam forming weight coefficient (generally, phase). The beam direction may also be set by adjusting the down tilt angle and the horizontal direction of an electrical tilt array antenna.

In this embodiment, the traffic distribution in the entire macro cell is gathered statistically in a long term to obtain the hotspot areas in the macro cell, including location and scope. By adjusting the beam (direction, beam width, transmit power, and so on) of the array antenna, this embodiment optimizes system networking conveniently, and is flexibly adaptable to services.

Figure 4:
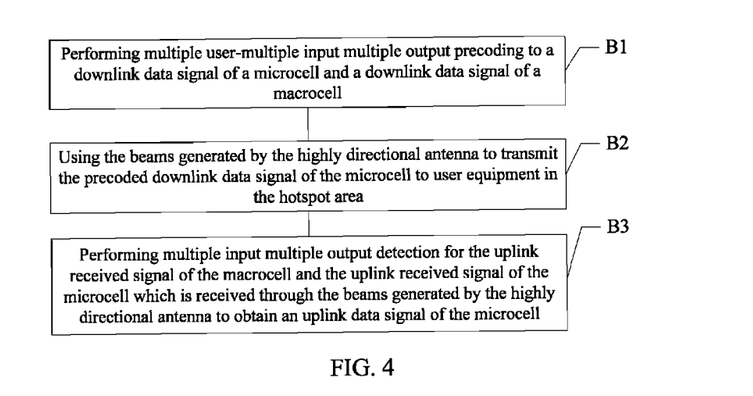
FIG. 4 is a method flowchart of generating microcell coverage for a hotspot area by using beams generated by a highly directional antenna according to a first embodiment of the present invention.

FIG. 4 is a method flowchart of generating microcell coverage for a hotspot area by using beams generated by a highly directional antenna according to a first embodiment of the present invention.

In this embodiment, the downlink data signal of the microcell may suffer interference from the downlink data signal of the macrocell, and the step (step A2) of generating microcell coverage for the hotspot area by using beams generated by the highly directional antenna may include:

B1. Performing multiple user-multiple input multiple output precoding for the downlink data signal of the microcell and the downlink data signal of the macrocell.

Specifically, this embodiment may perform multiple user-multiple input multiple output (Multiple User-Multiple Input Multiple Output, MU-MIMO) precoding for the downlink data signal of the microcell and the downlink data signal of the macrocell.

B2. Using the beams generated by the highly directional antenna to transmit the precoded downlink data signal of the microcell to the user equipment in the hotspot area.

Specifically, this embodiment uses the beams generated by the highly directional antenna to transmit the precoded downlink data signal of the microcell to the user equipment in the hotspot area after the multiple user-multiple input multiple output precoding is performed.

In this embodiment, a proper precoding vector is set to eliminate interference caused by the downlink data signal of the macrocell onto the downlink data signal of the microcell, and further enhance the system capacity.

In this embodiment, interference may be caused between the uplink signal of the macrocell and the uplink signal of the microcell.

Further, the step (step A2) of generating microcell coverage for the hotspot area by using beams generated by the highly directional antenna may further include:

B3. Performing multiple input multiple output detection for the uplink received signal of the macrocell and the uplink received signal of the microcell which is received through the beams generated by the highly directional antenna to obtain the uplink data signal of the microcell.

Specifically, this embodiment may perform multiple input multiple output detection for the uplink received signal of the macrocell and the uplink received signal of the microcell which is received through the beams generated by the highly directional antenna to obtain the uplink data signal of the microcell. It should be noted that in this embodiment, no strict order of execution exists between step B3 and steps B1 and B2. That is, step B3 may occur before step B1, or occur between step B1 and B2.

In this embodiment, a multiple input multiple output detection method is applied to eliminate interference caused by the uplink signal of the macrocell onto the uplink signal of the microcell, and further enhance the system capacity.

Figure 5:
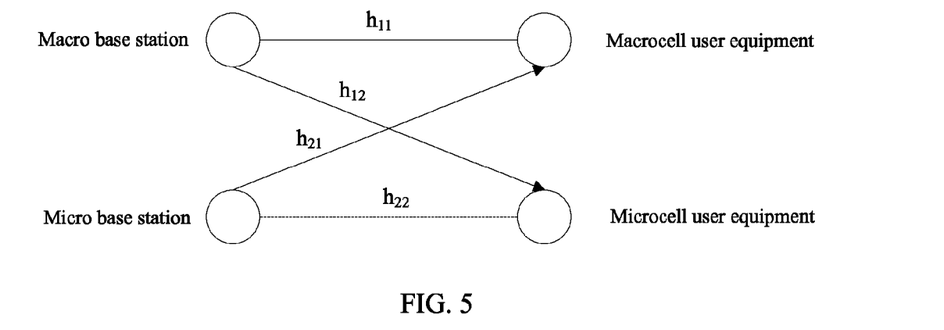
FIG. 5 is a schematic diagram of an equivalent MIMO channel between a microcell and a macrocell according to an embodiment of the present invention.

FIG. 5 is a schematic diagram of an equivalent MIMO channel between a microcell and a macrocell according to an embodiment of the present invention.

In this embodiment, the macro base station and the micro base station may share a site, and use different antennas respectively. Therefore, an equivalent multiple input multiple output (Multiple Input Multiple Output, MIMO) channel is formed between the macro base station, the micro base station, and the corresponding user equipments.

Where, $h_{11}$ is a channel coefficient for the channel from the macro base station to the macrocell user equipment (Macro Cell User Equipment, Macro-UE), $h_{22}$ is a channel coefficient for the channel from the micro base station to the microcell user equipment (Pico User Equipment, Pico-UE), $h_{12}$ is a channel coefficient for the channel from the macro base station to the Pico-UE, and $h_{21}$ is a channel coefficient for the channel from the micro base station to the Macro-UE. In the downlink direction, the signal from the macro base station to the Macro-UE and the signal from the micro base station to the Pico-UE are desired signals, and the signal from the macro base station to the Pico-UE and the signal from the micro base station to the Macro-UE are interfering signals. The interfering signals can be suppressed or even eliminated by using an MU-MIMO precoding technology and designing a proper precoding vector.

Figure 6:
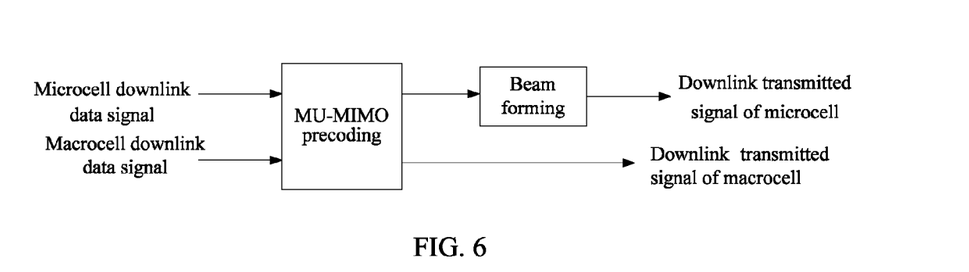
FIG. 6 is a schematic diagram of eliminating downlink interference signals in a cell creating method according to an embodiment of the present invention.

FIG. 6 is a schematic diagram of eliminating downlink interference signals in a cell creating method according to an embodiment of the present invention.

In this embodiment, the downlink processing procedure of using MU-MIMO precoding to eliminate interference is shown in FIG. 6. The downlink data signal of the microcell and the downlink data signal of the macrocell are precoded by an MU-MIMO precoding unit first, and then the precoded downlink data signal of the microcell undergoes beam forming to generate a downlink transmitted signal of the microcell, which is then transmitted. The precoded downlink data signal of the macrocell is transmitted by the antenna of the macro base station to generate a downlink transmitted signal of the macrocell, which is then transmitted.

Figure 7:
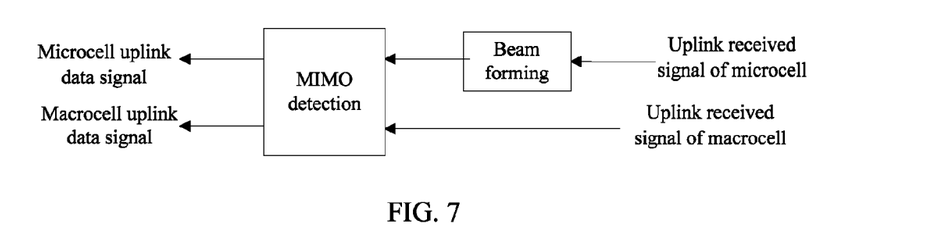
FIG. 7 is a schematic diagram of eliminating uplink interference signals in a cell creating method according to an embodiment of the present invention.

FIG. 7 is a schematic diagram of eliminating uplink interference signals in a cell creating method according to an embodiment of the present invention.

In this embodiment, the uplink direction is paired with the downlink direction. In the uplink direction, the signal from the Macro-UE to the macro base station and the signal from the Pico-UE to the micro base station are desired signals, and the signal from the Pico-UE to the macro base station and the signal from the Macro-UE to the micro base station are interfering signals. The interfering signals can be suppressed or even eliminated by using an MIMO detection technology. As shown in FIG. 7, the signals received from the highly directional antenna undergo beam forming first, and then, together with the signal received from the Macro antenna, are processed by a MIMO detecting unit to eliminate interference and separate their respective desired signals.

Figure 8:
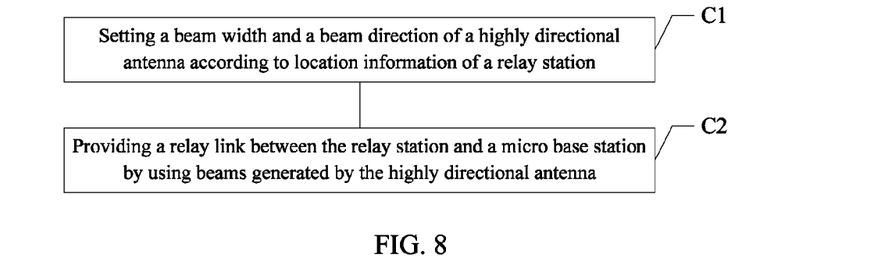
FIG. 8 is a flowchart of a cell creating method according to a second embodiment of the present invention.

FIG. 8 is a flowchart of a cell creating method according to a second embodiment of the present invention.

In this embodiment, a macrocell provides seamless continuous coverage for an area. The microcell creating method based on macrocell network coverage in this embodiment may include:

C1. Setting a beam width and a beam direction of a highly directional antenna according to location information of a relay station.

Specifically, in this embodiment, the location information of the relay station in the macrocell network may be obtained, and then the beam width and the beam direction of the highly directional antenna are set through a beam forming algorithm according to the location information of the relay station.

The relay station is located in the hotspot area, the location of the micro base station is called a site of the micro base station, and the site of the micro base station may be the same as the site of the macro base station. Besides, a beam corresponding to the beam width and the beam direction may be directed to the relay station. The location information of the relay station may include an azimuth of the relay station relative to the location of the micro base station, and so on. In an embodiment, the hotspot areas in a macrocell network may be obtained beforehand; in another embodiment, the traffic distribution in the entire macro cell may be gathered statistically to know the hotspot areas in the macrocell network.

C2. Providing a relay link between the relay station and the micro base station by using beams generated by the highly directional antenna.

Specifically, in this embodiment, highly directional beams generated by the highly directional antenna may be used to provide the relay link between the relay station and the micro base station. The relay station provides the microcell coverage for the hotspot area according to the relay link.

The relay link between the relay station and the micro base station provides multiple physical channels of the microcell such as common control channel, dedicated control channel, and traffic channel. The relay link is also used to transmit data between the user equipment in the hotspot area and the micro base station. The type of the microcell may be picocell (Pico cell) or femtocell (Femto cell).

The entity for executing the method in the second embodiment may be a micro base station. In this case, the location of the micro base station is called a site of the micro base station, and the site of the micro base station may be the same as the site of the macro base station.

It should be noted that in the second embodiment of the present invention, as an entity for executing the method, the micro base station shares a site with the macro base station in the area. In practice, the foregoing functions of the micro base station may be implemented by a corresponding device added into the macro base station. That is, the macro base station provides the macrocell coverage of the area, and the device added in the macro base station provides microcell coverage for the hotspot area. Therefore, in this case, the entity for executing the method of the present invention may be the macro base station, and the device added into the macro base station is equivalent to the micro base station. Therefore, the execution entity of the embodiment of the present invention shall not be construed as a limitation on the present invention.

In the second embodiment of the present invention, the beam width and the beam direction of the highly directional antenna are set according to location information of the relay station, and a relay link between the relay station and the micro base station is provided by using the beams generated by the highly directional antenna. According to the relay link, the relay station provides microcell coverage for the hotspot area. Compared with the prior art that requires selection of a new site of the micro base station, this embodiment of the present invention keeps the micro base station location unchanged when the hotspot area changes, and can implement microcell coverage for the hotspot area simply by adjusting the beam width and the beam direction of the highly directional antenna and the location of the relay station, thereby making the networking mode flexible and reducing the network maintenance costs.

In the microcell creating method provided in the second embodiment, the highly directional antenna may be an array antenna, or another type of antenna.

The microcell creating method provided in the second embodiment is applicable to the following scenario: when the hotspot area is located at the edge of the macro cell, the Pico cell may be provided by the relay station (Relay Station). This embodiment uses the beam forming antenna of the base station to generate directional beams directly for communicating with the relay station. Compared with the first embodiment in which the array antenna generates the microcell directly, the microcell creating method provided in the second embodiment of the present invention is more adaptable when the hotspot area is at the edge of the macrocell, and can provide microcell services for the hotspot area more stably.

Figure 9:
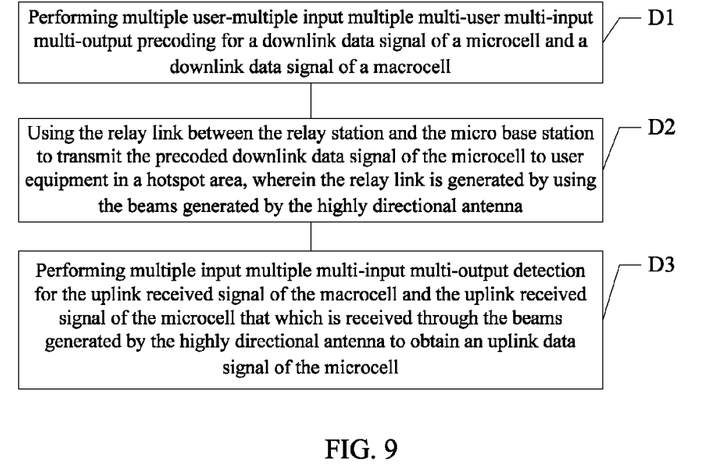
FIG. 9 is a method flowchart of providing a relay link between a relay station and a micro base station by using beams generated by a highly directional antenna according to a second embodiment of the present invention.

FIG. 9 is a method flowchart of providing a relay link between a relay station and a micro base station by using beams generated by a highly directional antenna according to the second embodiment of the present invention.

In this embodiment, the downlink data signal of the microcell may suffer interference from the downlink data signal of the macrocell, and the step (step C2) of providing the relay link between the relay station and the micro base station by using the beams generated by the highly directional antenna may include:

D1. Performing multiple user-multiple input multiple output precoding for the downlink data signal of the microcell and the downlink data signal of the macrocell.

Specifically, this embodiment may perform multiple user-multiple input multiple output precoding for the downlink data signal of the microcell and the downlink data signal of the macrocell.

D2. Using the relay link between the relay station and the micro base station to transmit the precoded downlink data signal of the microcell to the user equipment in the hotspot area, where the relay link is generated by using the beams generated by the highly directional antenna.

Specifically, this embodiment uses the relay link to transmit the precoded downlink data signal of the microcell to the user equipment in the hotspot area after the multiple user-multiple input multiple output precoding is performed, where the relay link is generated by using the beams generated by the highly directional antenna.

In this embodiment, a proper precoding vector is set to eliminate interference caused by the downlink data signal of the macro base station onto the downlink data signal of the micro base station, and further enhance the system capacity.

In this embodiment, interference may be caused between the uplink signal of the macro base station and the uplink signal of the micro base station.

Further, the step (step C2) of providing the relay link between the relay station and the micro base station by using the beams generated by the highly directional antenna may further include:

D3. Performing multiple input multiple output detection for the uplink received signal of the macrocell and the uplink received signal of the microcell which is received through the beams generated by the highly directional antenna to obtain the uplink data signal of the microcell.

Specifically, this embodiment may perform multiple input multiple output detection for the uplink received signal of the macrocell and the uplink received signal of the microcell that is received through the beams generated by the highly directional antenna to obtain the uplink data signal of the microcell. It should be noted that in this embodiment, no strict order of execution exists between step D3 and steps D1 and D2. That is, step D3 may occur before step D1, or occur between step D1 and D2.

In this embodiment, a multiple input multiple output detection method is applied to eliminate interference caused by the uplink signal of the macrocell onto the uplink signal of the microcell, and further enhance the system capacity.

The microcell creating method provided in embodiments of the present invention has been described in detail in above description, the following expounds a base station provided in embodiments of the present invention.

Figure 10:
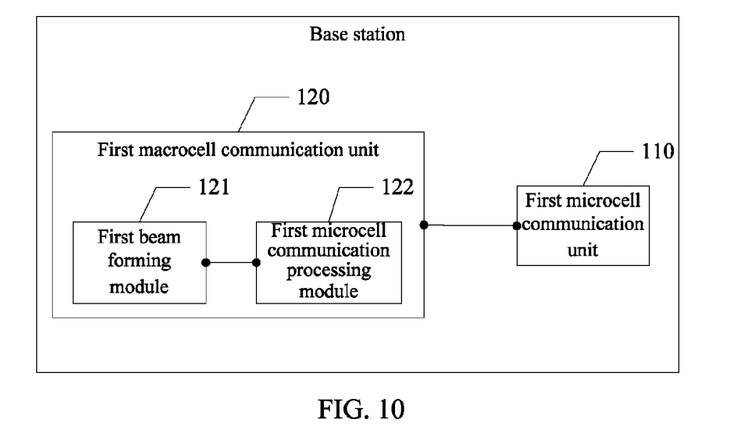
FIG. 10 is a schematic structural diagram of a base station according to a third embodiment of the present invention.

FIG. 10 is a schematic structural diagram of a base station according to a third embodiment of the present invention.

The base station provided in the third embodiment of the present invention includes: a first macrocell communication unit 110 and a first microcell communication unit 120, where the first macrocell communication unit 110 is configured to create a macrocell; and the first microcell communication unit 120 includes:

a first beam forming module 121, configured to set a beam width and a beam direction of a highly directional antenna according to location information of a hotspot area; and a first microcell communication processing module 122, configured to generate microcell coverage for the hotspot area by using beams generated by the highly directional antenna.

The base station provided in the third embodiment of the present invention may be applicable to the first embodiment described above. For detailed working principles of the base station, see the above first embodiment. The base station provided in the third embodiment of the present invention can set the beam width and the beam direction of the highly directional antenna according to location information of the hotspot area, and generate microcell coverage for the hotspot area directly by using the beams generated by the highly directional antenna. Compared with the prior art, this embodiment keeps the micro base station location unchanged when the hotspot area changes, and can implement microcell coverage for the hotspot area simply by adjusting the beam width and the beam direction of the highly directional antenna, thereby making the networking mode flexible and reducing the network maintenance costs.

Figure 11:
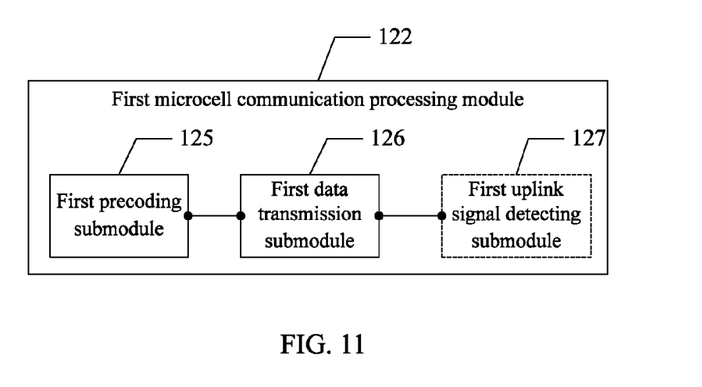
FIG. 11 is a schematic structural diagram of a microcell communication processing module in a base station according to a third embodiment of the present invention.

FIG. 11 is a schematic structural diagram of a microcell communication processing module in a base station according to a third embodiment of the present invention.

The first microcell communication processing module 122 in the base station provided in the third embodiment may include:

a first precoding submodule 125, configured to perform multiple user-multiple input multiple output precoding for the downlink data signal of the microcell and the downlink data signal of the macrocell area;

a first data transmission submodule 126, configured to use the beams generated by the highly directional antenna to transmit the precoded downlink data signal of the microcell to the user equipment in the hotspot area.

Further, the microcell communication processing module may include:

a first uplink signal detecting submodule 127, configured to perform multiple input multiple output detection for the uplink received signal of the macrocell and the uplink received signal of the microcell which is received through the beams generated by the highly directional antenna to obtain the uplink data signal of the microcell.

When the base station provided in this embodiment is applied in a practical scenario, a high-speed link may exist between the first microcell communication unit 120 and the first macrocell communication unit 110 to facilitate joint resource scheduling and interference management between the macrocell and the microcell.

The base station provided in the third embodiment of the present invention includes the first microcell communication unit 120 and the first macrocell communication unit 110, where the first microcell communication unit 120 may be integrated in the macro base station directly as an enhancement unit. In the practical base station equipment, the micro base station may share a part of the hardware units of the macro base station to improve the integration extent of the system, reduce the equipment cost, and reduce the system fault ratio and maintenance costs.

Figure 12:
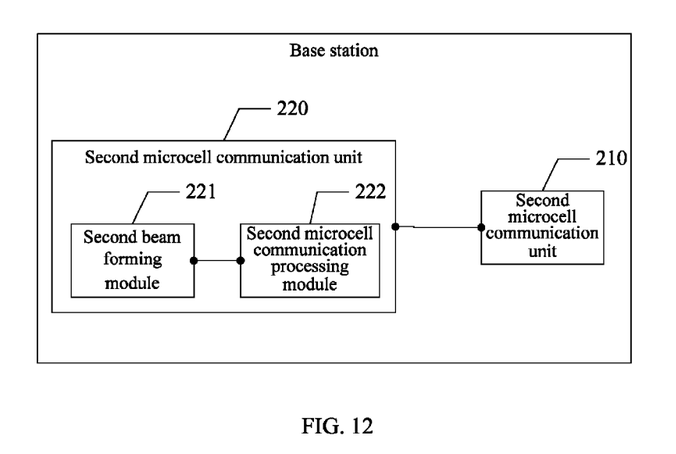
FIG. 12 is a schematic structural diagram of a base station according to a fourth embodiment of the present invention.

FIG. 12 is a schematic structural diagram of a base station according to a fourth embodiment of the present invention.

The base station provided in the fourth embodiment of the present invention includes: a second macrocell communication unit 210 and a second microcell communication unit 220, where the second macrocell communication unit 210 is configured to create a macrocell, and the second microcell communication unit 220 includes:

a second beam forming module 221, configured to set a beam width and a beam direction of a highly directional antenna according to location information of a relay station; and a second microcell communication processing module 222, configured to provide a relay link between the relay station and a micro base station by using beams generated by the highly directional antenna.

The base station provided in the fourth embodiment of the present invention can be applied to the second embodiment described above. For detailed working principles of the base station, see the above method embodiment.

In the fourth embodiment of the present invention, the base station sets the beam width and the beam direction of the highly directional antenna according to location information of the relay station, and provides a relay link between the relay station and the micro base station by using the beams generated by the highly directional antenna. According to the relay link, the relay station provides microcell coverage for the hotspot area. Compared with the prior art that requires selection of a new site of the micro base station, this embodiment of the present invention keeps the micro base station location unchanged when the hotspot area changes, and can implement microcell coverage for the hotspot area simply by adjusting the beam width and the beam direction of the highly directional antenna and the location of the relay station, thereby making the networking mode flexible and reducing the network maintenance costs.

The base station provided in fourth embodiment may be set up as a stand-alone part. When hotspot areas requiring a large capacity are lacking at the initial stage of network construction, macro base station equipment may be installed first. With increase of users, when a hotspot area requiring a large capacity appears in a macro cell, micro base station equipment is added on the basis of the macro base station equipment. In this way, the initial network construction cost of the operator is reduced.

Figure 13:
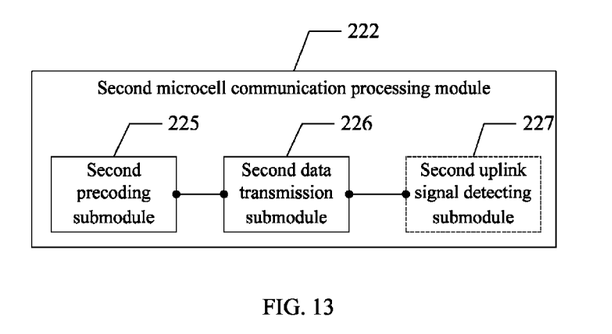
FIG. 13 is a schematic structural diagram of a second microcell communication processing module in a base station according to a fourth embodiment of the present invention.

FIG. 13 is a schematic structural diagram of a second microcell communication processing module in a base station according to a fourth embodiment of the present invention.

The second microcell communication processing module 222 in the base station provided in the fourth embodiment may include:

a second precoding submodule 225, configured to perform multiple user-multiple input multiple output precoding for the downlink data signal of the microcell and the downlink data signal of the macrocell; and a second data transmission submodule 226, configured to use the relay link between the relay station and the micro base station to transmit the precoded downlink data signal of the microcell to the user equipment in the hotspot area, where the relay link is generated by using the beams generated by the highly directional antenna.

Further, the second microcell communication processing module provided in the fourth embodiment may include:

a second uplink signal detecting submodule 227, configured to perform multiple input multiple output detection for the uplink received signal of the macrocell and the uplink received signal of the microcell which is received through the beams generated by the highly directional antenna to obtain the uplink data signal of the microcell.

When the base station provided in this embodiment is applied in a practical scenario, a high-speed link may exist between the second microcell communication unit 220 and the second macrocell communication unit 210 to facilitate joint resource scheduling and interference management between the macrocell and the microcell.

It should be noted that as regards the information exchange between the units in the apparatus and system above, the implementation processes, and so on, because they are based on the same conception as the method embodiment of the present invention, they are referenced in the method embodiment of the present invention and are not repeated here any further.

Persons of ordinary skill in the art should understand that all or part of the steps of the method disclosed in any above embodiment may be implemented by a program instructing relevant hardware. The program may be stored in a computer readable storage medium. When the program runs, the program may execute the procedure of the method specified in any above embodiment. The storage media may be a magnetic disk, CD-ROM, read-only memory (Read-Only Memory, ROM), random access memory (Random Access Memory, RAM), and so on.

The text above expounds the microcell creating method and the base station provided in exemplary embodiments of the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A microcell creating method based on macrocell network coverage, comprising:
    setting a beam width and a beam direction of a highly directional antenna according to location information of a hotspot area; and
    generating microcell coverage for the hotspot area by using beams generated by the highly directional antenna;
    wherein at least two microcells are created for at least two hotspot areas, and the at least two microcells share one group of highly directional antennas; wherein a beam forming weight vector of each of the microcells is designed to maximize a signal interference noise ratio (SINR) of the corresponding microcell, so as to make a user equipment in the corresponding microcell receive only a desired signal.

2. The method according to claim 1, wherein the generating microcell coverage for the hotspot area by using the beams generated by the highly directional antenna comprises:
    performing multiple user-multiple input multiple output precoding for a downlink data signal of each of the microcells and a downlink data signal of a macrocell; and
    using the beams generated by the highly directional antenna to transmit the precoded downlink data signal of each of the microcells to user equipment in the corresponding hotspot area.

3. The method according to claim 2, wherein the generating microcell coverage for the hotspot area by using the beams generated by the highly directional antenna further comprises:
    performing multiple input multiple output detection for the uplink received signal of the macrocell and the uplink received signal of each of the microcells which is received through the beams generated by the highly directional antenna to obtain an uplink data signal of the corresponding microcell.

4. The method according to claim 1, wherein:
    the highly directional antenna is an array antenna.

5. The method according to claim 1, wherein the highly directional antenna is a parabolic antenna.

6. A microcell creating method based on macrocell network coverage, comprising:
    setting a beam width and a beam direction of a highly directional antenna according to location information of a relay station; and
    providing a relay link between the relay station and a micro base station by using beams generated by the highly directional antenna;
    wherein at least two microcells are created for at least two hotspot areas according to at least two relay links; and the at least two microcells share one group of highly directional antennas; wherein a beam forming weight vector of each of the microcells is designed to maximize a signal interference noise ratio (SINR) of the corresponding microcell, so as to make a user equipment in the corresponding microcell receive only a desired signal.

7. The method according to claim 6, wherein:
    the highly directional antenna is an array antenna.

8. The method according to claim 6, wherein the providing the relay link between the relay station and the micro base station by using the beams generated by the highly directional antenna comprises:
    performing multiple user-multiple input multiple output precoding for a downlink data signal of each of the microcells and a downlink data signal of a macrocell; and
    using each of the relay links between a corresponding relay station and the micro base station to transmit the precoded downlink data signal of the corresponding microcell to a user equipment in the corresponding hotspot area, wherein each of the relay links is generated by using the beams generated by the highly directional antenna.

9. The method according to claim 8, wherein the providing the relay link between the relay station and the micro base station by using the beams generated by the highly directional antenna further comprises:
    performing multiple input multiple output detection for the uplink received signal of the macrocell and the uplink received signal of each of the microcells which is received through the beams generated by the highly directional antenna to obtain an uplink data signal of the corresponding microcell.

10. The method according to claim 6, wherein the highly directional antenna is a parabolic antenna.

11. A base station, comprising:
    a macrocell communication unit, configured to generate macrocell coverage, wherein
    the base station further comprises a microcell communication unit, and the microcell communication unit comprises:
    a beam forming module, configured to set a beam width and a beam direction of a highly directional antenna according to location information of a hotspot area; and
    a microcell communication processing module, configured to generate microcell coverage for the hotspot area by using beams generated by the highly directional antenna, wherein at least two microcells are created for at least two hotspot areas, and the at least two microcells share one group of highly directional antennas;
    wherein the beam forming module is further configured to design a beam forming weight vector of each of the microcells to maximize a si al interference noise ratio (SINR) of the corresponding microcell, so as to make a user equipment in the corresponding microcell receive only a desired signal.

12. The base station according to claim 11, wherein the microcell communication processing module comprises:
    a precoding submodule, configured to perform multiple user-multiple input multiple output precoding for a downlink data signal of each of the microcells and a downlink data signal of a macrocell; and
    a data transmission submodule, configured to use the beams generated by the highly directional antenna to transmit the precoded downlink data signal of each of the microcells to a user equipment in the corresponding hotspot area.

13. The base station according to claim 12, wherein the microcell communication processing module further comprises:
    an uplink signal detecting submodule, configured to perform multiple input multiple output detection for an uplink received signal of a macrocell and an uplink received signal of each of the microcells which is received through the beams generated by the highly directional antenna to obtain an uplink data signal of the corresponding microcell.

14. A base station, comprising:
a macrocell communication unit, configured to generate macrocell coverage, wherein
the base station further comprises a microcell communication unit, and the microcell communication unit comprises:
a beam forming module, configured to set a beam width and a beam direction of a highly directional antenna according to location information of a relay station; and
a microcell communication processing module, configured to provide a relay link between the relay station and a micro base station by using beams generated by the highly directional antenna, wherein at least two microcells are created for at least two hotspot areas according to at least two relay links, and the at least two microcells share one group of highly directional antennas;
wherein the beam forming module is further configured to design a beam forming weight vector of each of the microcells to maximize a signal interference noise ratio (SINR) of the corresponding microcell, so as to make a user equipment in the corresponding microcell receive only a desired signal.

15. The base station according to claim 14, wherein the microcell communication processing module comprises:
a precoding submodule, configured to perform multiple input multiple output precoding for a downlink data signal of each of the microcells and a downlink data signal of a macrocell; and
a data transmission submodule, configured to use each of the relay links between a corresponding relay station and the micro base station to transmit the precoded downlink data signal of the corresponding microcell to a user equipment in the corresponding hotspot area, wherein each of the relay links is generated by using the beams generated by the highly directional antenna.

16. The base station according to claim 15, wherein the microcell communication processing module further comprises:
an uplink signal detecting submodule, configured to perform multiple input multiple output detection for an uplink received signal of the macrocell and an uplink received signal of each of the microcells which is received through the beams generated by the highly directional antenna to obtain an uplink data signal of the corresponding microcell.

* * * * *

UNITED STATES PATENT AND TRADEMARK OFFICE
CERTIFICATE OF CORRECTION

PATENT NO. : 8,750,890 B2  
APPLICATION NO. : 13/717155  
DATED : June 10, 2014  
INVENTOR(S) : Liu Page 1 of 1

It is certified that error appears in the above-identified patent and that said Letters Patent is hereby corrected as shown below:

On the Title Page, Item [71], delete "Guangdong (CN)" and insert -- Shenzhen (CN) --.

In the Claims

Column 14, line 47, Claim 11, delete "a si al interference" and insert -- a signal interference --.

Signed and Sealed this
Second Day of December, 2014

Michelle K. Lee
*Deputy Director of the United States Patent and Trademark Office*